United States Patent
Kim et al.

(10) Patent No.: US 10,116,346 B2
(45) Date of Patent: Oct. 30, 2018

(54) ELECTRONIC DEVICE AND ANTENNA USING COMPONENTS OF ELECTRONIC DEVICE

(71) Applicant: Samsung Electronics Co., Ltd., Gyeonggi-do (KR)

(72) Inventors: Yeon Woo Kim, Seoul (KR); Gyu Sub Kim, Seoul (KR); Kyung Gu Kim, Gyeonggi-do (KR); Woo Sup Lee, Gyeonggi-do (KR); Se Hyun Park, Gyeonggi-do (KR); Joon Ho Byun, Gyeonggi-do (KR); Jin Woo Jung, Seoul (KR); Jae Bong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 14/688,316

(22) Filed: Apr. 16, 2015

(65) Prior Publication Data
US 2015/0303557 A1    Oct. 22, 2015

(30) Foreign Application Priority Data

Apr. 16, 2014    (KR) .................. 10-2014-0045562

(51) Int. Cl.
*H01Q 1/24*    (2006.01)
*H04B 1/40*    (2015.01)
(Continued)

(52) U.S. Cl.
CPC ............... *H04B 1/40* (2013.01); *H01Q 1/243* (2013.01); *H01Q 1/44* (2013.01); *H01Q 5/35* (2015.01); *H01Q 5/378* (2015.01); *H01Q 9/42* (2013.01)

(58) Field of Classification Search
CPC ............ H01Q 1/38; H01Q 1/40; H01Q 1/243; H01Q 1/44; H01Q 9/42; H01Q 5/35; H01Q 5/378
See application file for complete search history.

(56) References Cited

U.S. PATENT DOCUMENTS

| 7,408,512 | B1 | 8/2008 | Rodenbeck et al. |
| 7,408,518 | B2 | 8/2008 | Minard et al. |

(Continued)

FOREIGN PATENT DOCUMENTS

| CN | 102077414 | 5/2011 |
| CN | 102684726 | 9/2012 |

(Continued)

OTHER PUBLICATIONS

International Search Report dated Jun. 30, 2015 issued in counterpart application No. PCT/KR2015/003791, 3 pages.

(Continued)

*Primary Examiner* — Dieu H Duong
(74) *Attorney, Agent, or Firm* — The Farrell Law Firm, P.C.

(57) ABSTRACT

An electronic device is provided that includes a circuit board and an antenna fed from the circuit board. The antenna includes a plurality of conductive components. Each of the plurality of conductive components is disposed on a portion of a respective one of a plurality of electronic components of the electronic device. The plurality of conductive components are connected by at least one connection component.

19 Claims, 20 Drawing Sheets

(51) Int. Cl.
*H01Q 1/44* (2006.01)
*H01Q 9/42* (2006.01)
*H01Q 5/35* (2015.01)
*H01Q 5/378* (2015.01)

(56) References Cited

U.S. PATENT DOCUMENTS

| | | | |
|---|---|---|---|
| 8,519,895 B2 | 8/2013 | Cviko | |
| 8,606,195 B2 | 12/2013 | Suetake et al. | |
| 8,836,584 B2 | 9/2014 | Kim et al. | |
| 8,836,587 B2 | 9/2014 | Darnell et al. | |
| 9,502,752 B2 | 11/2016 | Darnell et al. | |
| 9,705,180 B2 | 7/2017 | Darnell et al. | |
| 2007/0171140 A1 | 7/2007 | Minard et al. | |
| 2011/0081954 A1* | 4/2011 | Suetake | H01Q 1/243 455/575.5 |
| 2011/0102289 A1 | 5/2011 | Leem | |
| 2011/0193749 A1 | 8/2011 | Cviko | |
| 2012/0206302 A1 | 8/2012 | Ramachandran et al. | |
| 2012/0235866 A1 | 9/2012 | Kim et al. | |
| 2013/0050026 A1* | 2/2013 | Vin | H01Q 1/22 343/700 MS |
| 2013/0249766 A1 | 9/2013 | He | |
| 2013/0257659 A1* | 10/2013 | Darnell | H01Q 1/243 343/702 |
| 2014/0327584 A1* | 11/2014 | Chang | H01Q 1/243 343/702 |
| 2014/0347232 A1* | 11/2014 | Mahanfar | H01Q 1/521 343/720 |
| 2015/0035706 A1 | 2/2015 | Darnell et al. | |
| 2015/0364813 A1 | 12/2015 | Darnell et al. | |

FOREIGN PATENT DOCUMENTS

| | | |
|---|---|---|
| CN | 103367864 | 10/2013 |
| JP | 2006-049978 | 2/2006 |
| KR | 1020060035588 | 4/2006 |
| KR | 100742098 | 7/2007 |
| WO | WO 2011/095676 | 8/2011 |

OTHER PUBLICATIONS

European Search Report dated Nov. 13, 2017 issued in counterpart application No. 15779753.1-1927, 7 pages.

Chinese Office Action dated Aug. 3, 2018 issued in counterpart application No. 201580020225.6, 20 pages.

* cited by examiner

ELECTRONIC DEVICE AND ANTENNA USING COMPONENTS OF ELECTRONIC DEVICE

PRIORITY

This application claims priority under 35 U.S.C. § 119(a) to a Korean Patent Application filed in the Korean Intellectual Property Office on Apr. 16, 2014, and assigned Serial No. 10-2014-0045562, the contents of which are incorporated herein by reference.

BACKGROUND OF THE INVENTION

1. Field of the Invention

The present invention relates generally to an antenna and an electronic device including the same, and more particularly, to an antenna using components of an electronic device.

2. Background of the Invention

Wireless communication electronic devices have been adapted into terminals, such as smart phones, that have advanced communication and data processing rates and provide user assistance in addition to the functionality of web surfing. Such a wireless communication electronic device includes an antenna system for wireless communication. In order to improve the portability of electronic devices, the latest antennas have evolved into built-in type antennas.

An electronic device may include many elements of various units or modules, such as, for example, a processor, a memory, a battery, a camera unit, various kinds of sensors, diverse chips supporting Bluetooth or Near Field Communication (NFC), an ear jack, a key button structure, a home key structure, etc. An antenna is typically installed to avoid or be separate from such components, thus limiting the space for the antenna.

SUMMARY OF THE INVENTION

The present invention has been made to address at least the above problems and/or disadvantages, and to provide at least the advantages described below.

An aspect of the present invention may provide an antenna formed using a variety of structures or components equipped in an electronic device.

In accordance with an embodiment of the present invention, an electronic device is provided that includes a circuit board and an antenna fed from the circuit board. The antenna includes a plurality of conductive components. Each of the plurality of conductive components is disposed on a portion of a respective one of a plurality of electronic components of the electronic device. The plurality of conductive components are connected by at least one connection component.

In accordance with another embodiment of the present invention, an antenna of an electronic device is provided. The antenna includes a plurality of conductive components. Each of the plurality of conductive components are disposed on a portion of a respective one of a plurality of electronic components of the electronic device. The antenna also includes at least one connection component connecting the plurality of conductive components.

BRIEF DESCRIPTION OF THE DRAWINGS

The above and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1A:
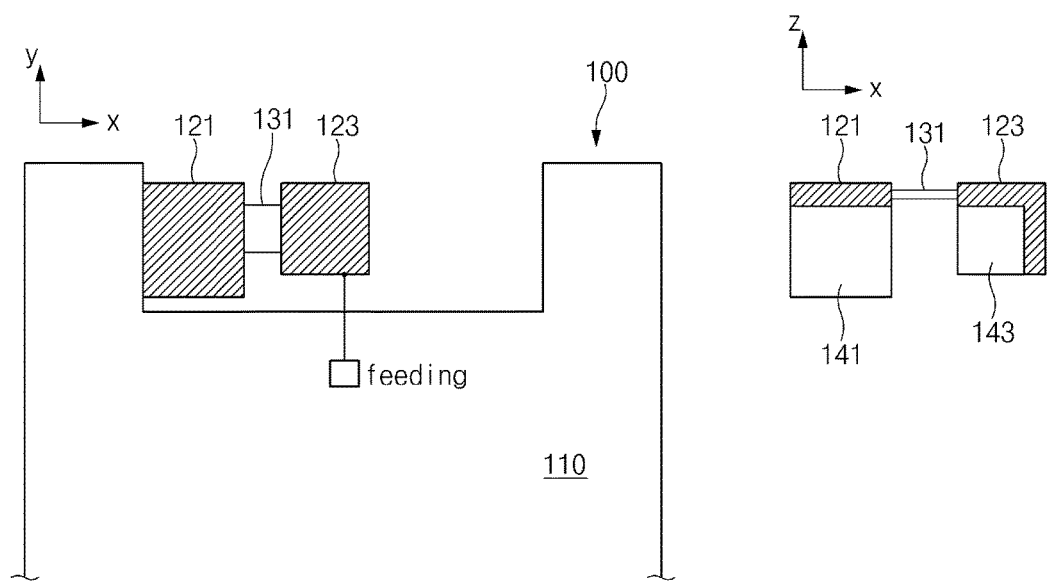
FIG. 1A is a diagram illustrating an antenna of an electronic device, according to an embodiment of the present invention.

Embodiments of the present invention are described with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms "include," "comprise," "have", "may include," "may comprise", "may have", as used herein, indicate functions, operations, or the existence of elements, but do not exclude other functions, operations, or elements. Additionally, as used herein, the meaning of "include," "comprise," "including," or "comprising," specifies a property, a region, a fixed number, a step, a process, an element, and/or a component, but does not exclude other properties, regions, fixed numbers, steps, processes, elements, and/or components.

The meaning of the term "or", as used herein, includes any or all combinations of the words connected by the term "or". For example, the expression "A or B" may indicate include A, B, or both A and B.

Terms such as "1st", "2nd", "first", "second", and the like, as used herein, may refer to modifying various different elements of various embodiments, but do not limit the elements. For example, such terms do not limit the order and/or priority of the elements. Furthermore, such terms may be used to distinguish one element from another element. For example, both "a first user device" and "a second user device" indicate different user devices. A first component may be referred to as a second component, and vice versa, without departing from the scope of embodiments of the present invention.

When one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used herein are used to describe embodiments of the present invention and are not intended to limit the scope of the present invention. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and are commonly used, should also be interpreted as is customary in the relevant related art and not in an idealized or overly formal sense unless expressly defined herein in various embodiments of the present invention.

An electronic device, according to an embodiment of the present invention, includes a communication function. For example, an electronic device may be embodied as at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, and a wearable device (e.g., a Head-Mounted-Device (HMD) such as electronic glasses, electronic apparel, an electronic bracelet, an electronic necklace, an electronic accessory, an electronic tattoo, and a smart watch).

According to an embodiment of the present invention, an electronic device may be embodied as a smart home appliance having a communication function. The smart home appliance may include at least one of, for example, a television, a Digital Versatile Disc (DVD) player, an audio device, a refrigerator, an air conditioner, an oven, a microwave oven, a washing machine, an air cleaner, a set-top box, a TV box, a game console, an electronic dictionary, an electronic key, a camcorder, and an electronic picture frame.

According to an embodiment of the present invention, an electronic device may be embodied as at least one of various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, car head units, industrial or household robots, financial institutions' Automated Teller Machines (ATMs), and stores' Point Of Sale (POS) systems.

According to an embodiment of the present invention, an electronic device may include at least one of furniture or buildings/structures having a communication function, electronic boards, electronic signature receiving devices, projectors, or various measuring instruments (for example, water, electricity, gas, or radio signal measuring instruments). An electronic device, according to an embodiment of the present invention, may be one of the above-described devices or a combination thereof. Additionally, an electronic device, according to an embodiment of the present invention, may be a flexible device. Furthermore, it is apparent to those skilled in the art that an electronic device, according to an embodiment of the present invention, is not limited to the above-described devices.

Hereinafter, an electronic device, according to an embodiment of the present invention, is described with reference to the accompanying drawings. The term "user", as used herein, may refer to a person using an electronic device or a device using an electronic device (for example, an artificial intelligence electronic device).

FIG. 1A is a diagram illustrating an antenna of an electronic device, according to an embodiment of the present invention. In FIG. 1A, an electronic device 100 is shown on the x-y plane, and components 121, 123, 131, 141 and 143 are delineated on the z-x plane.

Referring to FIG. 1A, the electronic device 100 includes a circuit board 110, a plurality of the conductive materials 121 and 123 placed over at least one region of one or more of a plurality of the electronic components 141 and 143, and a connection component 131 connecting the conductive materials 121 and 123. The conductive materials may be implemented in conductive components. Conductive components and conductive materials may be used interchangeably herein for sake of convenience.

An antenna including the conductive materials 121 and 123 and the connection component 131 are fed power from the circuit board 110. This power is fed to at least one point of the conductive materials 121 and 123 and the connection component 131.

According to an embodiment of the present invention, the electronic device 100 may further include a supplementary (additional) radiator for making the antenna receive signals in a target frequency band. The supplementary radiator may be connected, for example, at a point of the conductive materials 121 and 123 and the connection component 131. According to an embodiment of the present invention, the electronic device 100 (or an antenna built in the electronic device 100) may include a radiator 140, or not, depending on a target frequency band. Additionally, the electronic device 100 may further include an antenna (radiator) pattern that is electrically connected with the conductive material (e.g. the conductive material 121) in a part of the region of the circuit board 110.

The conductive material 121 is illustrated as being placed on top of (in the z direction) the electronic component 141, while the conductive material 123 is illustrated as being placed on top of and on the right side (the z and x directions) of the electronic component 143. In various embodiments of the present invention, the conductive material may be disposed in some region of the electronic components. For example, at least one of the conductive components 121 and 123 may correspond to a housing of the electronic component.

The antenna is illustrated to include two conductive materials 121 and 123, whereas in various embodiments of the present invention, the antenna of the electronic device 100 may include three or more conductive components. Additionally, as shown in FIG. 1A, the conductive components 121 and 123 are placed on at least respective sides of the electronic components 141 and 143, whereas in various embodiments of the present invention, at least one of the plurality of electronic components may not be coupled using the conductive component, but may be coupled on circuit. For example, when there are five electronic components, conductive components coupled with some number (e.g., three) of connection components may be placed at sides of four electronic components, while the remaining one electronic component may be coupled on circuit or coupled physically without any conductive component.

According to an embodiment of the present invention, a plurality of electronic components (e.g., the components 141 and 143) may be disposed in a region that is formed by partial cutoff of the circuit board 110 (e.g., Printed Circuit Board (PCB)). A plurality of the electronic components 141 and 143 may be disposed out of the circuit board 110. In an embodiment of the present invention, a plurality of the electronic components 141 and 143 may be disposed in a housing (e.g., case or cover) of the electronic device 100, and outside of the circuit board 110. In an embodiment of the present invention, for a particular electronic component (e.g., rear camera module), some portion of the particular electronic component (e.g., lens) may be partially disposed outside of a housing of the electronic device 100.

Disposing a plurality of electronic components (e.g. the components 141 and 143) out of the circuit board 110 may bring many advantages to the electronic device. For example, if several components are disposed on the circuit board 110, the electronic device 100 will have a thickness that is greater than a sum of the thicknesses of the circuit board 110 and the components. Typically, components or chips may be placed on the back side of the circuit board 110 while other components are set on the front side of the circuit board 110. For example, the front side of the circuit board 110 may include components such as a power control module, modems (e.g. $4^{th}$ Generation (4G), Global System for Mobile Communications (GSM), Universal Mobile Telecommunications System (UMTS), and Long Term Evolution (LTE)), and Random Access Memory (RAM), while the back side of the circuit board 110 may include components such as a power amplifier module, an NFC chip, a microcontroller, or a transmitter. Additionally, if an antenna is added thereto, the electronic device 100 may be enlarged in size or thickness. However, if a plurality of conductive components, which are placed at sides of one or more of a plurality of electronic components and disposed off of the circuit board 110, are used as an antenna structure, an antenna with a target frequency band may be achieved while minimizing interference due to the thickness of the circuit board 110. Further, since the electronic components are not installed directly on the board, space may be saved for disposing components.

As shown in FIG. 1A, the circuit board 110 may be a "U" shape. In various embodiments of the present invention, shapes of the circuit board 110 may vary. The circuit board 110 may be cut off enough to permit an empty space, which can accommodate a plurality of electronic components, between the boundary of the circuit board 110 and the outside of the electronic device 100. Additionally, in various embodiments of the present invention, the circuit board 110 may have various sizes and shapes to meet topological conditions for accommodating a plurality of components in such an empty space.

Referring back to FIG. 1A, the conductive components 121 and 123 are connected to the connection component 131. In various embodiments of the present invention, the connection component 131 may be partially or entirely made of a conductive material. For example, a Flexible Printed Circuit (FPC) or a Flexible Printed Circuit Board (FPCB) includes a signal line to communicate various signals such as control signals with some components, a ground line to provide ground, or a ground area such as a ground layer. In this configuration, since the ground area has conductivity, the FPC may correspond to the connection component 131. If the connection component 131 is an FPC, the FPC may be coupled with a plurality of the conductive components using the smallest amount of space, due to its flexibility, regardless of different thicknesses, sizes, and shapes of the plurality of the conductive components or electronic components. In various embodiments of the present invention, the connection components may be prepared in correspondence with a Steel Use Stainless (SUS) or bracket for supporting a plurality of conductive components (or electronic components combined with conductive components), or a connection structure equipped with at least one electronic component and a conductive layer. The FPC, SUS, or bracket may be engaged with a fixed member (component) placed on the circuit board 110 or in the electronic device 100, a case of the electronic device 100, or a member constituting the exterior of the electronic device 100, which fastens electronic components thereto and prevents them from shaking or detaching.

The circuit board 110 may provide the ground (GND) and the power feeding at different points of the plurality of conductive components 121 and 123 and the connection components 131. In an embodiment of the present invention, the circuit board 110 may feed power to at least one point of the plurality of conductive components 121 and 123 and the connection component 131, and the ground may or may not be supplied. For example, referring to FIG. 1A, the conductive component 121 is coupled with a ground area of the circuit board 110 at a left point, which is connected to the circuit board 110. In another embodiment of the present invention, the power feeding may be provided without any supply of the ground.

In an embodiment of the present invention, an antenna including the plurality of the conductive components 121 and 123 and the connection component 131 may be structured in the form of an Inverted-F Antenna (IFA) or Planar IFA (PIFA). Moreover, a supplementary radiator, which functions to transceive (transmit and receive) signals in a target frequency band, may be connected with at least a point of the conductive component or the connection component. In an embodiment of the present invention, it may be practical to prepare a slit region consisting of the plurality of conductive components 121 and 123, the connection components 131, a power feeding structure (e.g., feeding module or feeding unit), and the circuit board 110. In an embodiment of the present invention, a ground structure form such a slit region. While a part (or a partial region) of the plurality of conductive components 121 and 123 may physically contact the circuit board 110, the remaining components may be isolated (set apart) from the circuit board 110 to form a slit space (e.g., in the embodiment of FIG. 1A, all of the conductive components are apart from the circuit board 110). The term "physically contact" or "physically coupled" may mean that first and second units partially contact each other regardless of whether the contact is conductive. The term "electrically connected" may mean that there are conditioned electrical channels, by way of conductive lines, circuits, or elements, between the first and second units regardless of whether they is a substantial contacting therewith.

While FIG. 1A illustrates that the conductive component 123 is fed power, various embodiments of the present invention are not restricted thereto. For example, both the ground and the power feeding may be provided to the conductive component 123, or at least one of the ground and the power feeding may be provided by way of the connection component 131.

Figure 1B:
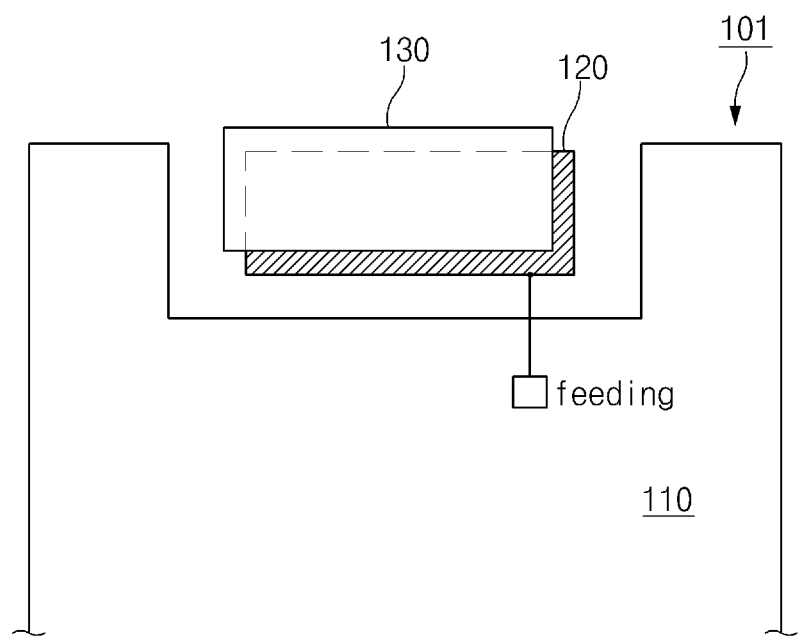
FIG. 1B is a diagram illustrating an antenna apart from a circuit board, according to an embodiment of the present invention.

FIG. 1B is a diagram illustrating an antenna apart from a circuit board, according to an embodiment of the present invention.

Referring to the illustration of FIG. 1B, a conductive component 120 is fed power from the circuit board 110, enabling an antenna to operate. While FIG. 1B shows the conductive component 120 as a single component, the conductive component 120 may represent a plurality of conductive components coupled to each other through a connection component 130. Additionally, the feeding may be provided directly to a plurality of the conductive components 120 or provided via the connection component 130.

According to an embodiment of the present invention, a ground (GND) region may be provided to a plurality of the conductive components 120 through an additional line. For example, an element (e.g., a high-frequency interrupter 550 of FIG. 5A) may be inserted into a connector (e.g., GND connector) between a plurality of the conductive components 120 and the circuit board, making the ground disconnect therefrom when the antenna is operating.

Figure 1C:
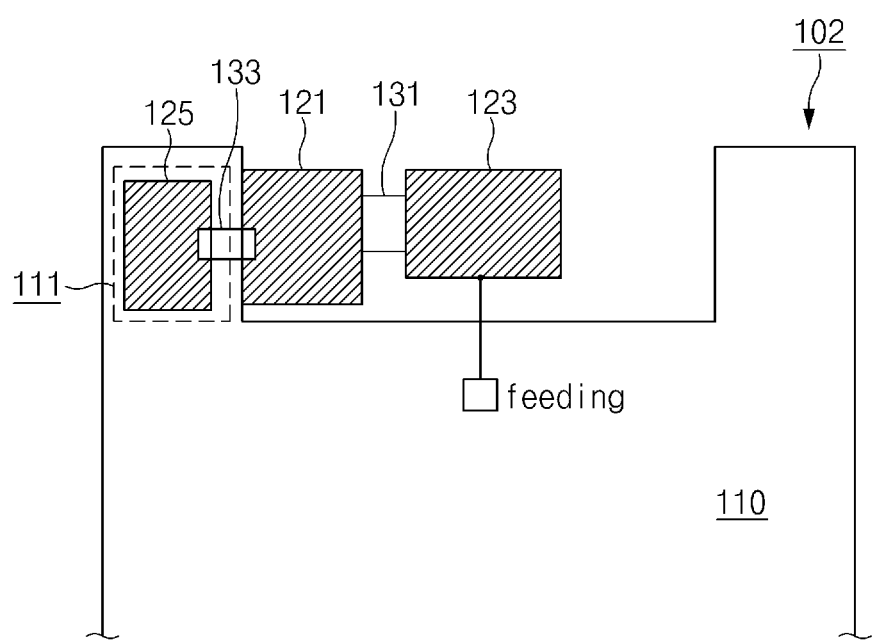
FIG. 1C is a diagram illustrating an antenna utilizing a plurality of electronic components placed in and out of a circuit board, according to an embodiment of the present invention.

FIG. 1C is a diagram illustrating an antenna utilizing a plurality of electronic components placed in and out of a circuit board, according to an embodiment of the present invention.

Referring to FIG. 1C, an electronic device 102 includes a plurality of conductive components 121, 123 and 125, and connection components 131 and 133. The conductive components 121 and 123 are disposed away from the circuit board 110, while the conductive component 125 is disposed in a fill-cut region 111 of the circuit board 110. The fill-cut region 111 may correspond to a region where a conductive layer is excluded from an area of a PCB, such as FR-4, and thereby an insulation material is exposed.

As shown in FIG. 1C, the conductive components 121 and 123 are coupled to each other through the connection component 131, and the conductive components 121 and 125 are coupled to each other through the connection components 133. In an embodiment of the present invention, the conductive component 125 may be coupled with the conductive component 121 through the circuit board 110. Additionally, the conductive components 121, 123 and 125 may be coupled to each other by way of a single connection component (e.g., the connection component 130 of FIG. 1B). Although not shown in FIG. 1C, the conductive components 121, 123 and 125 may be placed respectively at sides of their corresponding electronic components, as shown in FIG. 1A. With the configuration of FIG. 1C, it is possible to utilize an antenna with the components arranged a suitable place in consideration of their sizes, shapes, durability, fixation stability, etc.

The description about one of FIGS. 1A, 1B, and 1C is not restricted to the illustrations, and may be applicable to other illustrations by the accompanied drawings. For example, from FIG. 1C, the conductive components 121, 123 and 125 may be supplied with power feeding only, or all may be supplied with both a ground and the power feeding. Additionally, a supplementary radiator may be extended from the conductive component 123 or 125.

Figure 2A:
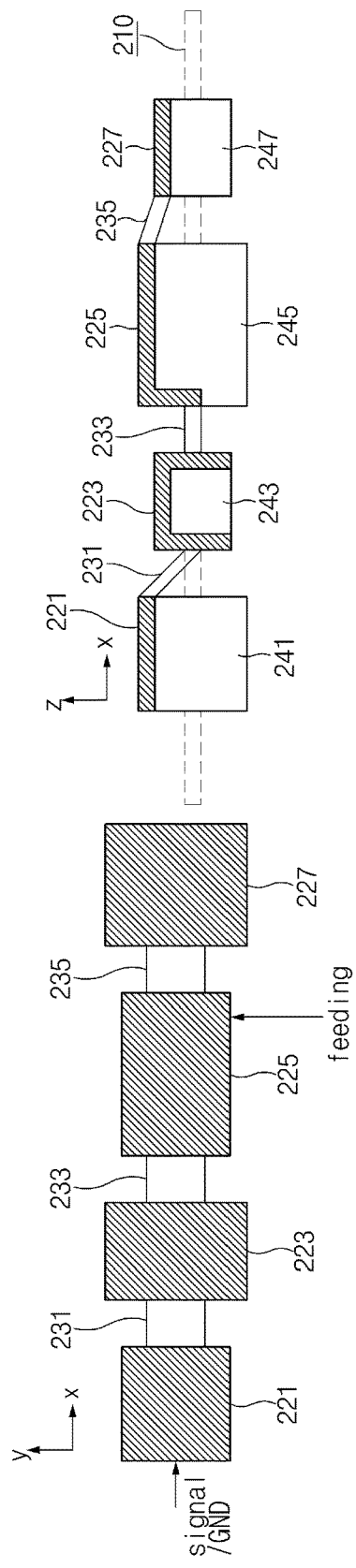
FIG. 2A is a diagram illustrating a connection between a plurality of conductive components, according to an embodiment of the present invention.

FIG. 2A is a diagram illustrating a connection between conductive components, according to an embodiment of the present invention. Conductive components 221, 223, 225 and 227, connection components 231, 233 and 235, and electronic components 241, 243, 245 and 247 on the x-y plane and the z-x plane.

According to an embodiment of the present invention, the components shown in FIG. 2A constitute a part of the antenna illustrated in FIG. 1A. For example, the conductive components 121 and 123 and the connection component 131, of FIG. 1A, are replaced with the conductive components 221, 223, 225 and 227 and the connection components 231, 233 and 235.

According to an embodiment of the present invention, a circuit board 210 may feed power to a component (e.g., the conductive component 225) among the plurality of the conductive components. Additionally, a component (e.g., the conductive component 221) may be connected with a ground area of the circuit board 210. This connection may be provided with a ground line, or with signal lines used for controlling electronic components (e.g., the electronic components 241, 243, 245, and 247).

Referring to FIG. 2A, the conductive components 221, 223, 225, and 227 may be disposed on respective partial regions of the electronic components 241, 243, 245 and 247. At least one conductive component may be prepared by coating a conductive material on an electronic component. As shown in FIG. 2A, the conductive components 221, 223, 225, and 227 are disposed in various regions of the electronic components 241, 243, 245, and 247, such as the top exterior of the electronic component 241 for the conductive component 221, the top, left, and right sides of the electronic component 243 for the conductive component 223, and the top and a part of the left side of the electronic component 245 for the conductive component 225. Further, a conductive component may be disposed over all of the outer regions, except the top surface of the electronic component (e.g., for the conductive component 225 shown in FIG. 2B).

As shown in FIG. 2A, particularly, on the x-z plane), the electronic components 241, 243, 245, and 247 share some height with the circuit board 210 in the z-axis. With this structure, the thickness of the electronic device 100 may be reduced. Additionally, for example, it may be possible to prevent an electronic component, such as a rear-faced camera module, from protruding.

Figure 2B:
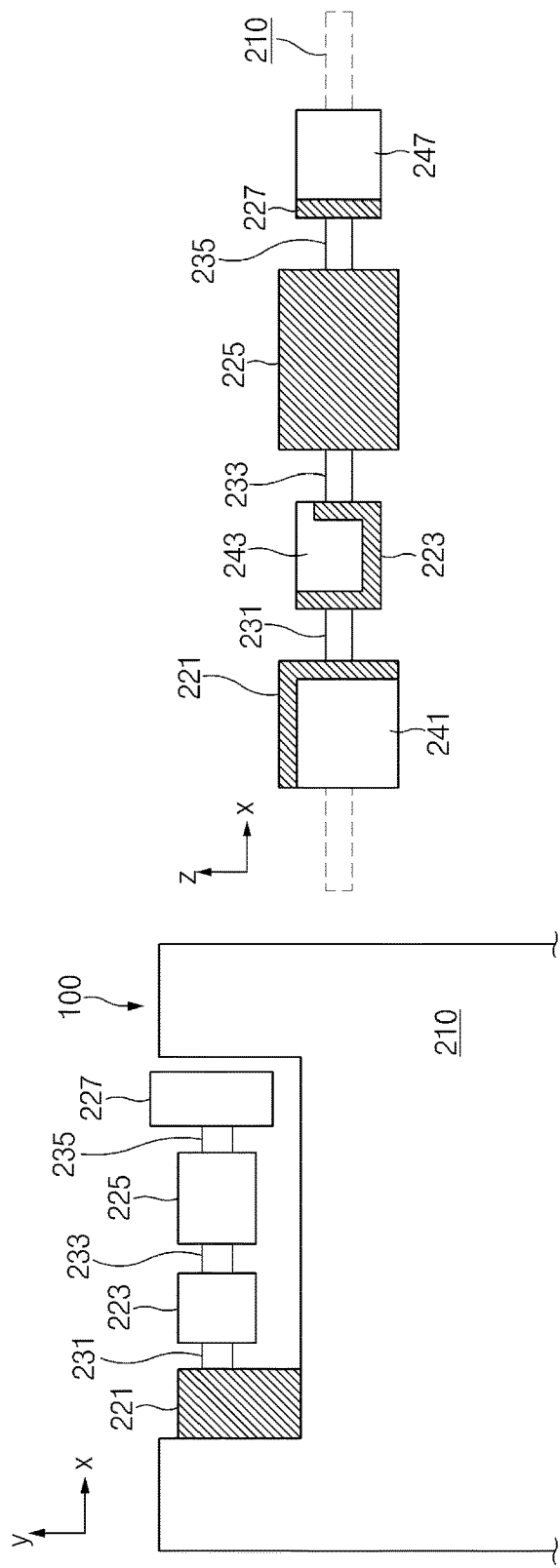
FIG. 2B is a diagram illustrating a connection between a plurality of conductive components, according to another embodiment of the present invention.

FIG. 2B is a diagram illustrating a connection between conductive components, according to an embodiment of the present invention. In FIG. 2B are shown the conductive components 221, 223, 225, and 227, the connection components 231, 233, and 235, and the electronic components 241, 243, 245, and 247 on the x-y plane and the x-z plane. The components of FIG. 2B are differentiated from those of FIG. 2A in placement and interconnection, and the forgoing description relevant to FIG. 2A does not limit the configuration of FIG. 2B.

Referring to FIG. 2B, an electronic device 200 includes the electronic components 241, 243, 245, and 247, which are disposed in an outside region (e.g., a region formed by partly cutting off the circuit board 210). The electronic components 241, 243, 245, and 247 are not uniform in size and thickness. Additionally, the conductive components 221, 223, 225, and 227, which are disposed on at least one side of the electronic components electronic components 241, 243, 245 and 247. The connection components 231, 233, and 245 couple the conductive components 221, 223, 225, and 227 each other, enabling them to operate as an antenna radiator.

According to an embodiment of the present invention, the connection component is a conductive material or a component containing a conductive material, being configured to couple a plurality of conductive components. For example, the connection component may be an FPC, a SUS, or a bracket, which are described in greater detail below with reference to FIGS. 5 and 6.

Referring to FIG. 2B, the circuit board 210 and the connection components 231, 233, and 235 are disposed on the same plane. For example, the connection components 231, 233, and 235 are arranged as apart from or partly overlaid with the plane on which the circuit board 210 is placed, in order to couple the conductive components which are disposed at respective electronic components. Using this arrangement, it is possible to insert the electronic components 241, 243, 245, and 247 into the circuit board 210 and utilize the electronic components (or the conductive components) for an antenna radiator. According to an embodiment of the present invention, the connection components 231, 233 and 235 may extend, more than illustrated, to occupy most of the region left by cutting off the circuit board 210, or an outside region of the circuit board 210 where the electronic components are placed. Additionally, the connection components 231, 233, and 235 may be formed in one componential body extending along a direction (e.g., the y-direction) and linking up together, and not in a divisional structure.

According to an embodiment of the present invention, power feeding may be provided to regions of the conductive or connection components, and the ground may be provided to the same and/or other regions thereof. In some embodiments of the present invention, it is possible to provide only the power feeding without the ground. When accompanied with both the ground and the power feeding, an antenna may be structure in a form of PIFA, IFA or loop. When the power feeding is provided without the ground, an antenna may be structured in a monopole.

For example, if the conductive component is fed power while the conductive component 227 is connected with a ground area of the circuit board 210, a current flow may be generated by way of the components 227, 235, 225, 233, 223, 231, and 221, and the circuit board 210. The electronic device 200 may generate diverse current flows to induce resonance in a target frequency band by modifying a power-fed point (component) or a grounded point (component).

According to an embodiment of the present invention, an electronic component (e.g. the electronic component 241) may be one of Universal Serial Bus (USB), micro-USB, lightening connector, or one having a conductive or metallic exterior (e.g., the conductive component 221). In this configuration, an electrical path may be opened by means of a conductive/metallic exterior, a connection component, and a power feeding portion (and a grounding portion).

As shown in FIG. 1A, 1B, 1C, 2A, or 2B, a supplementary radiator may be coupled with at least a point of the conductive or connection component. According to an embodiment of the present invention, an antenna pattern placed in the circuit board 110 may be electrically connected with a conductive component. Additionally, according to an embodiment of the present invention, a supplementary radiator may not be physically connected with a plurality of conductive components, but disposed where the supplementary radiator can be electrically coupled with the conductive components. According to an embodiment of the present invention, a supplementary antenna may extend over metallic (conductive) parts of components (e.g., conductive or connection components) included in an antenna, without restriction to any specific connection feature.

Figure 3A:
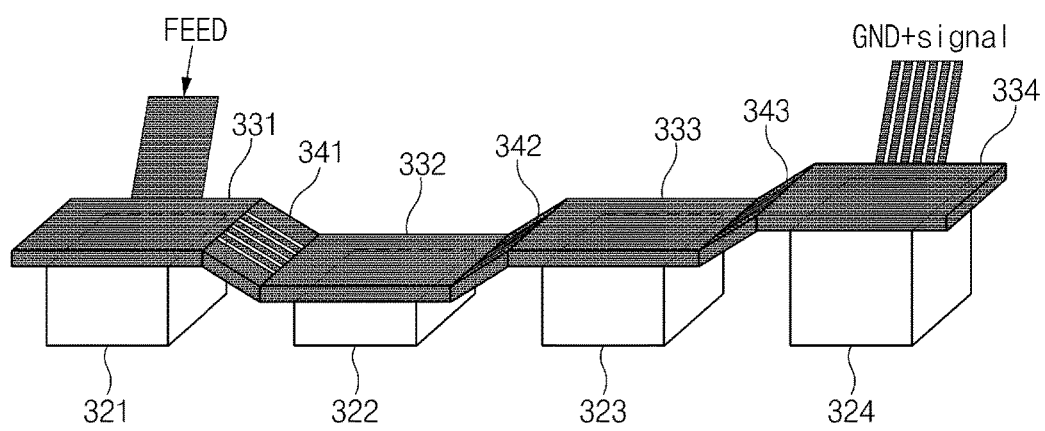
FIG. 3A is a diagram illustrating an antenna, to which a signal line is connected, according to an embodiment of the present invention.

FIG. 3A is a diagram illustrating an antenna, to which a signal line is connected, according to an embodiment of the present invention.

The antenna of FIG. 3A includes conductive components 331, 332, 333 and 334, which are physically coupled with electronic components 321, 322, 323, and 324. Additionally, the antenna includes connection components 341, 342, and 343, which couple the conductive components to each other. For descriptive convenience, FIG. 3 is shown as an example in which the conductive components are placed on the tops of the respective electronic components.

In an embodiment of the present invention, a plurality of the conductive components or the connection components are made of FPC or a flexible material including a conductive layer. A conductive connection material may include a wiring structure. For example, such a wiring structure may be signal lines for communication with control and data signals exchanged between a communication module (e.g., a communication module 1020 of FIG. 10) and the electronic components 321, 322, 323, and 324. Such signal lines may be used for transmission channels of signals, each controlling operations of the electronic components 321, 322, 323, and 324. As shown in FIG. 3A, in an electronic device, the wiring structure, with the conductive components and the connection components coupling the conductive components, may couple a circuit board (e.g., the circuit board 110) with the electronic components 321, 322, 323, and 324, enable control signals, which are transferred from a processor (e.g., an Application Processor (AP)) and so on, to control the components.

Figure 3B:
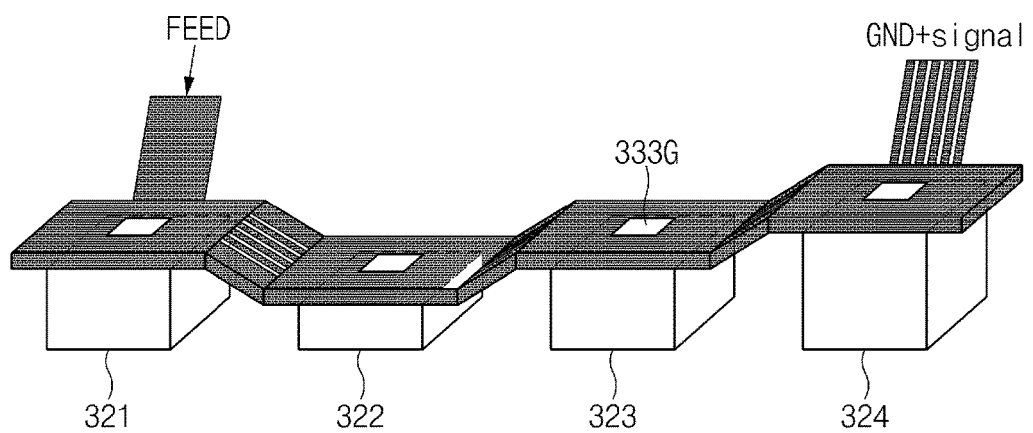
FIG. 3B is a diagram illustrating an antenna, in which a ground area is exposed on a conductive component, according to an embodiment of the present invention.

As shown in FIG. 3B, a point of the conductive component 331 is fed power, while the conductive component 334 is grounded. According to an embodiment of the present invention, the conductive component 331 is fed power without grounding. Additionally, a supplementary antenna pattern may be connected at a point of the conductive component 332 or the connection component 341, which is different from the points at which the ground and the power feeding are provided. With respect to an antenna including the configuration shown in FIG. 3A, it may be possible to utilize a space, in which the components are arranged, as a space for the antenna in an electronic device (e.g., the electronic device 100).

FIG. 3B is a diagram illustrating an antenna, in which a ground area is exposed on a conductive component, according to an embodiment of the present invention.

The embodiment illustrated in FIG. 3B is a modification of the embodiment illustrated in FIG. 3A.

As shown in FIG. 3B, a ground area 333G is exposed at a point on at least one conductive component (e.g., the conductive component 323). In an embodiment of the present invention, a respective ground area is disposed at a point on each of the conductive components 331, 332, 333, and 334. The at least one ground area 333G may be connected with a metallic piece, for example, an additional metallic piece such as a supporting unit or bracket for upholding an FPC, to provide an electric path therethrough. This addition of an electrical path may contribute to improve the performance of an antenna.

Figure 4A:
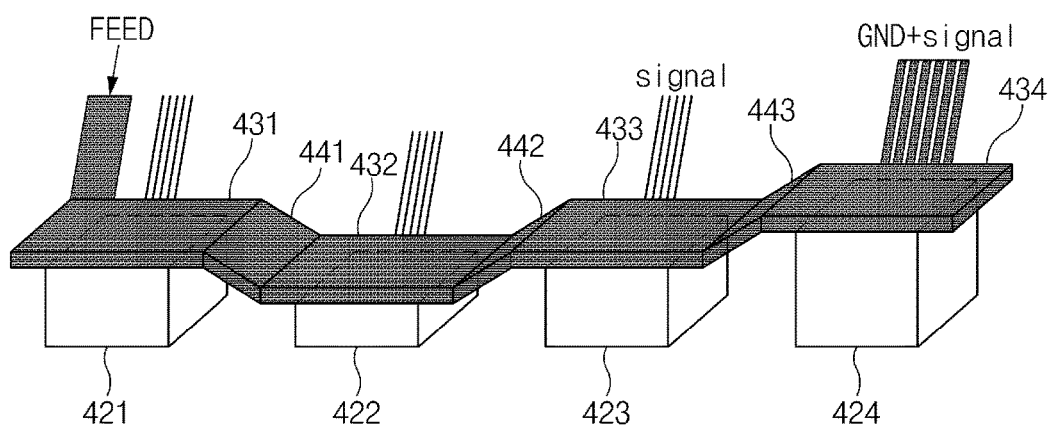
FIG. 4A is a diagram illustrating an antenna, in which respective signal lines are correspondingly connected with respective components, according to an embodiment of the present invention.

FIG. 4A is a diagram illustrating an antenna, in which respective signal lines are correspondingly connected with respective components, according to an embodiment of the present invention.

The antenna of FIG. 4A includes conductive components 431, 432, 433, and 434, which are physically coupled with electronic components 421, 422, 423, and 424, respectively. Additionally, the conductive components 431, 432, 433, and 434 are coupled to each other through connection components 441, 442, and 443. According to an embodiment of the present invention, the connection components 441, 442, and 443 correspond to an FPC or to a general metallic piece. The conductive component 434 is provided with a ground and a signal line. A signal line provided with a ground may be used for controlling the electronic component 424. A signal line for controlling the electronic components 421, 422, and 423 may be individually divided, as shown in FIG. 4A, to form connection structures respective to the electronic components. These signal lines may be connected directly with a circuit board (e.g., the circuit board 110).

One difference between the embodiments shown in FIGS. 3A and 4A is that a plurality of signal lines of FIG. 4A are directly coupled with the components or an FPC in which the components are placed. The embodiment of FIG. 4A may be considerably more effective in manufacturing and repairing the products. For example, components employed in an electronic device may be manufactured and fabricated in a variety of companies. Regarding the components shown in FIG. 3A, control signals for controlling the components may not be directly transferred to the components, but are transferred thereto by way of other components through an FPC (or conductive materials including wires). In this configuration, a company producing the electronic component 323 (or the electronic components 322 and 321, or at least one of a plurality of the conductive components) may meet technical limitations in designing circuits, which are associated with the component 323, before obtaining design information and data about the electronic component 322 or 324. However with the embodiment shown in FIG. 4A, if a manufacturer equally provides design information of a circuit board for component companies, rendering the component companies to independently produce components or conductive connection materials without dependence upon conditions of producing or designing other components, it may be possible to improve the production efficiency for the manufacturer or the component companies.

With respect to repairing products based on the embodiment of FIG. 3A, for example, if the electronic component 323 malfunctions or breaks down, other components and conductive connection materials which are all coupled physically or electrically with the electronic component 323 would be required to be entirely replaced. With respect to the embodiment of FIG. 4A, for example, even if the electronic component 423 malfunctions or breaks down, it may be enough to only replace the electronic component 423 with a new one. Accordingly, independently arranging the signals lines as such may be considerably effective in producing and repairing the products.

Figure 4B:
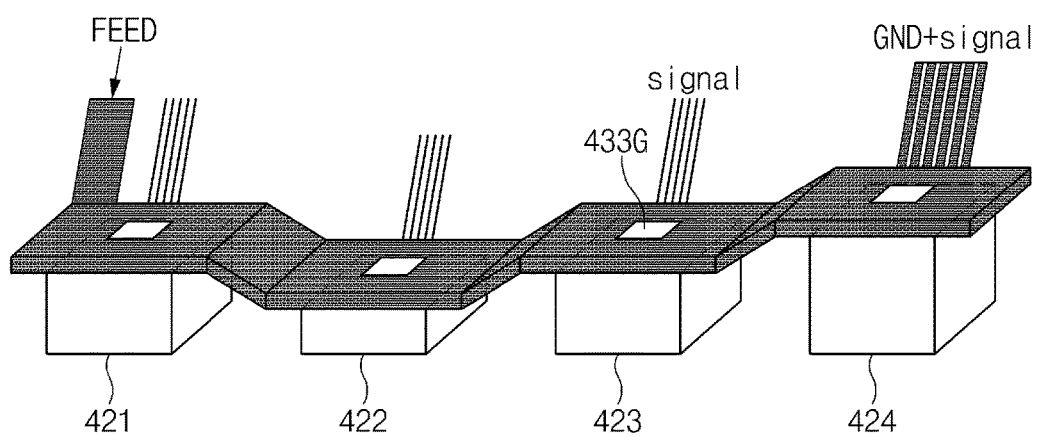
FIG. 4B is a diagram illustrating an antenna, in which respective signal lines are correspondingly connected with respective components and a ground area is exposed on conductive components, according to an embodiment of the present invention.

FIG. 4B is a diagram illustrating an antenna, in which respective signal lines are correspondingly connected with respective components and a ground area is exposed on conductive components, according to an embodiment of the present invention.

The embodiment of FIG. 4B is a modification of the embodiment of FIG. 4A.

In FIG. 4B, a ground area 433G is exposed at a point on the conductive component 433. In an embodiment of the present invention, ground areas may be disposed at points on the respective conductive components 431, 432, 433, and 434. The at least ground area 433G may be coupled with an additional metallic piece, such as a supporter or bracket, for fixing or upholding an FPC.

Figure 5A:
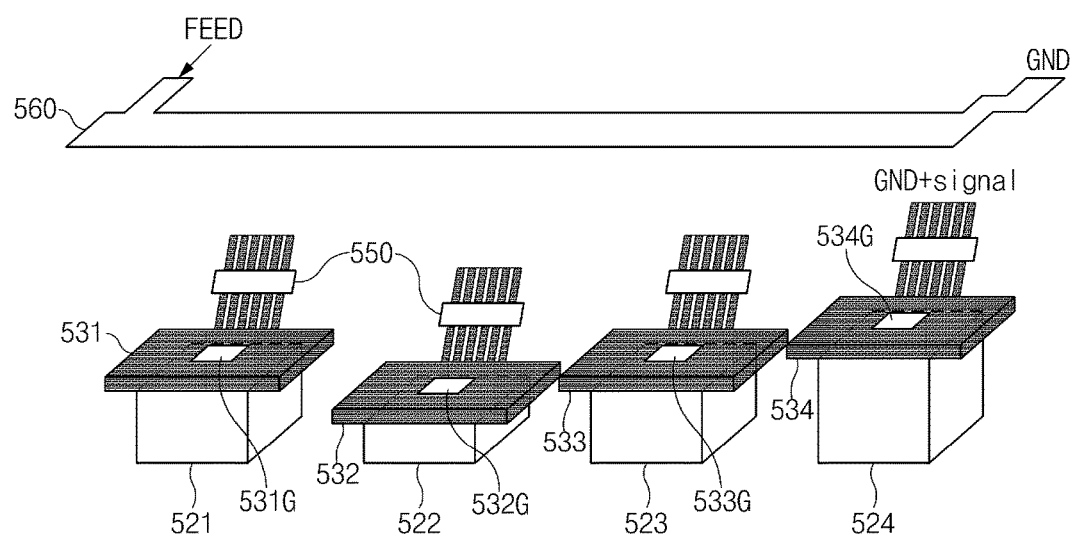
FIG. 5A is a diagram illustrating an antenna, in which a lumped element is included and in which a connection component is connected with an exposed ground area, according to an embodiment of the present invention.

FIG. 5A is a diagram illustrating an antenna, in which a lumped element is included and a connection component is coupled with an exposed ground area, according to an embodiment of the present invention.

As described herein, the lumped element may refer to an element with a uniform current distribution regardless of its position in the circuit. According to an embodiment of the present invention, the lumped element may indicate an RLC element. The lumped element may act to delay or regulate a variation of current or voltage at an output terminal (e.g. by effects of capacitor (C) or inductor (L)) even when an input current or voltage is fluctuating.

Returning to FIG. 5A, the antenna includes conductive components 531, 532, 533, and 534, which are each physically coupled with at least one of electronic components 521, 522, 523, and 524. A connection component 560 is coupled with ground areas 531G, 532G, 533G, and 534G, which are disposed on respective conductive components. The conductive components 531, 532, 533, and 534 may be composed of a first conductive material while the connection component 560 may be composed of a second conductive material. In an embodiment of the present invention, the ground is provided at a first end of the connection component 560, while the power feeding is provided at a second end of the connection component 560. The connection component 560 is illustrated in the form of plane, however, the connection component 560 may be bent or curved in accordance with sizes, heights, or shapes of the electronic components 521, 522, 523, and 524 (or the respective conductive components). Additionally, the antenna may include an antenna radiator extending from one of the first conductive material or the second conductive material.

In an embodiment of the present invention, the conductive components 531, 532, 533, and 534 may be coupled with a circuit board (e.g., the circuit board 110) in a structure of signal line and ground. As illustrated in FIG. 5A, the signal line and ground structure includes a lumped element 550. Therefore, a ground structure connected with a circuit board together with a signal line may enable a grounding function to be carried out in a ground structure of the connection component 560 (e.g., the second conductive material). As shown in FIG. 5A, the antenna includes the first conductive material and the second conductive material, and also includes grounding and power feeding structures coupled with different points of the second conductive material. Additionally, it may be possible to transceive signals in a target frequency band by way of a supplementary radiator, which extends from a point of the antenna structure.

Figure 5B:
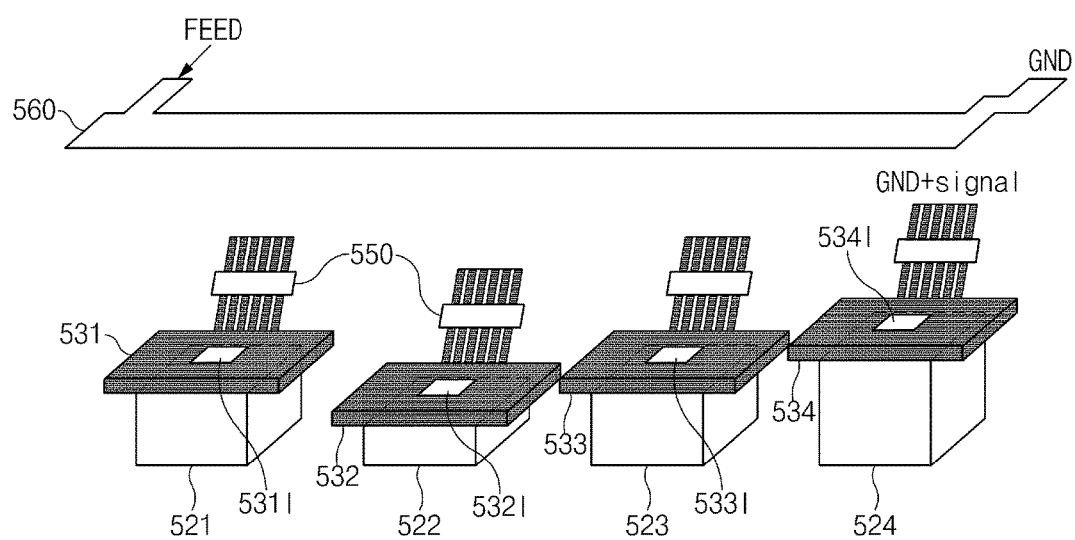
FIG. 5B is a diagram illustrating an antenna, in which a lumped element is included and a connection component is configured in electrical insulation to respective components, according to an embodiment of the present invention.

FIG. 5B is a diagram illustrating an antenna, in which a lumped element is included and a connection component is coupled to an insulation area, according to an embodiment of the present invention.

The embodiment illustrated in FIG. FIG. 5B is a modification of the embodiment illustrated in FIG. 5A.

Referring to FIG. 5B, the conductive components 531, 532, 533 and 534 include insulation areas 5311, 5321, 5331 and 5341. The insulation areas 531, 5321, 5331 and 5341 may allow electrical insulation between a ground area of the first conductive material and the second conductive material. Although the insulation areas 5311, 5321, 5331 and 5341 are illustrated as occupying a partial region of the first conductive material, the insulation areas may cover the overall area of the first conductive material. According to an embodiment of the present invention, it is possible to prepare a wider insulation area capable of offering insulation to the overall field where all components (i.e., the electronic components 521, 522, 523 and 524)/conductive components are distributed. The insulation areas may be formed of a suitable material such as, for example, insulative tapes.

Figure 5C:
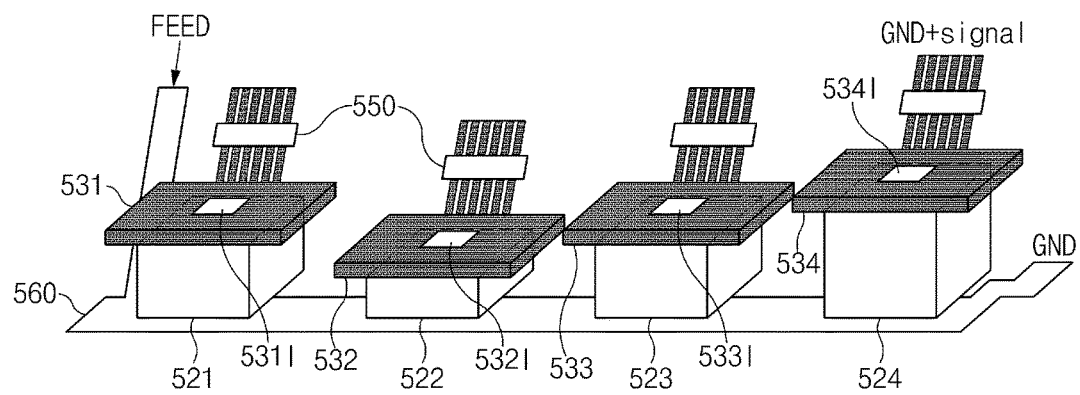
FIG. 5C is a diagram illustrating an antenna, in which a lumped element is included and a connection component is connected with a bottom of a component, according to an embodiment of the present invention.

FIG. 5C is a diagram illustrating an antenna, in which a lumped element is included and a supplementary conductive material is configured in an electrical insulation to respective components, according to an embodiment of the present invention.

The embodiment illustrated in FIG. 5C is a modification of the embodiment illustrated in FIG. 5A or 5B.

Referring to FIG. 5C, an insulation area is formed in a partial region of the conductive connection components 531, 532, 533 and 534. The second conductive material (i.e., the connection component 560) is coupled at the bottoms of the electrical components 521, 522, 523, and 524, and the insulation areas 5311, 5321, 5331 and 5341 provide insulation between components (or metallic pieces) and other metallic members connectable with the conductive components 531, 532, 533 and 534.

According to an embodiment of the present invention, different points of the second conductive material 560 may be provided with the grounding and the power feeding. The power feeding only may be supplied to a point of the second conductive material 560. Additionally, an antenna radiator for transceiving signals in a specific frequency band may be coupled with a region of the second conductive material, a component physically connected and electrically connected to the second conductive material, or a region of the first conductive material. As shown in FIG. 5C, by fastening the tops of the electronic components 521, 522, 523, and 524 by means of the first conductive material (e.g., FPC), and the bottoms of the components 521, 522, 523, and 524 by means of the second conductive material (e.g., supporter or bracket), it is possible to improve the strength and stability of the components while securing a maximum amount of space for the antenna.

Figure 6A:
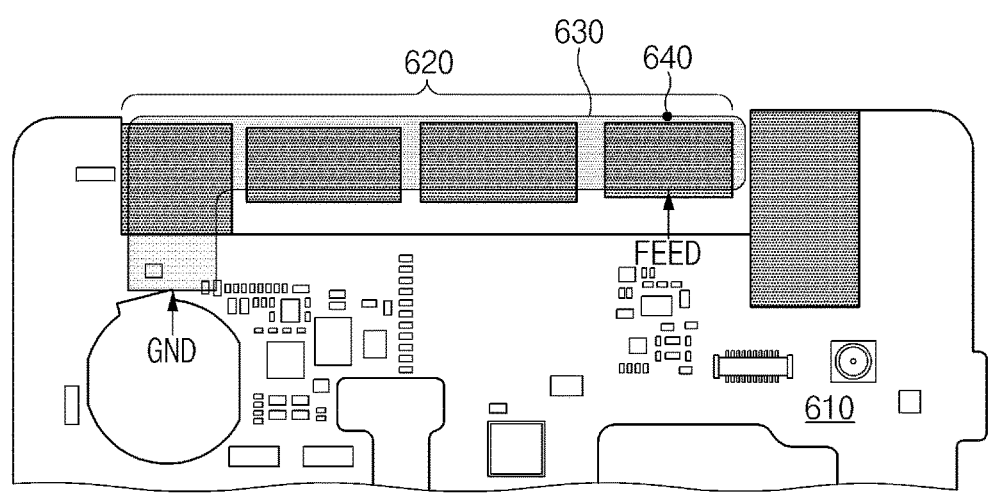
FIG. 6A is a diagram illustrating an antenna having a power feeding structure and a grounding structure, according to an embodiment of the present invention.

FIG. 6A is a diagram illustrating an antenna having a power feeding and grounding structure, according to an embodiment of the present invention.

Referring to FIG. 6A, the antenna includes conductive components 620 disposed on a side of a plurality of electronic components arranged in an empty space made by a structure of a circuit board 610, and a connection component 630 supporting the conductive components 620 and providing a wiring structure to a plurality of the electronic components. The conductive components 620 and the connection component 630 may be regarded as constituting a first antenna structure.

According to an embodiment of the present invention, the power feeding and the ground may each be provided to different points in the first antenna structure. As described above, the power feeding and the ground may be provided to the connection component 630 and to the conductive components 620. The power feeding and the ground may be provided to different conductive components or connection components.

According to an embodiment of the present invention, the antenna of FIG. 6A may include a second antenna structure extending from a point 640 (e.g., a point of the conductive components 620 or the connection component 630) of the first antenna structure. The second antenna structure may be connected directly or indirectly with the first antenna structure. For example, the second antenna structure may be a radiator pattern to enable λ/4 of a corresponding wavelength for receiving a specific band frequency and directly coupled with the first antenna structure. Alternatively, the second antenna structure may be configured to induce a coupling effect with the first antenna structure and may be indirectly coupled with the first antenna structure.

Figure 6B:
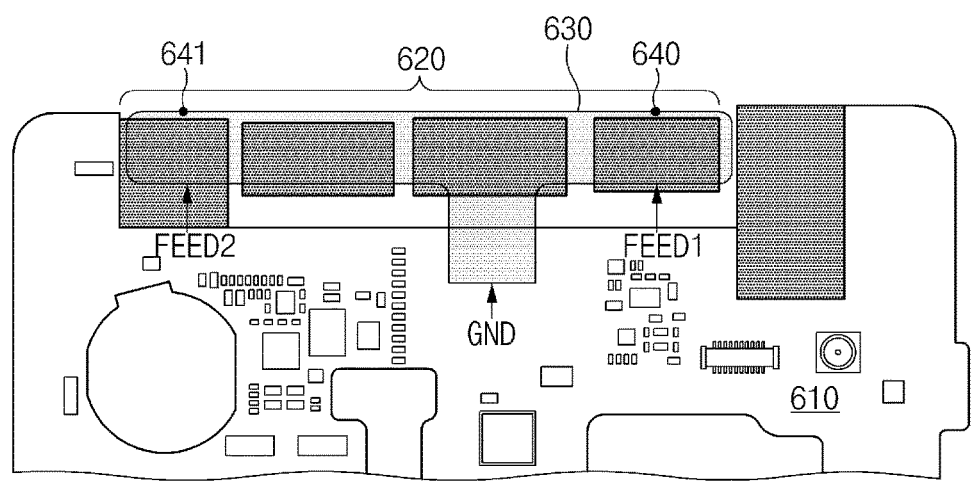
FIG. 6B is a diagram illustrating an antenna having a plurality of power feeding structures, according to an embodiment of the present invention.

FIG. 6B is a diagram illustrating an antenna having a plurality of power feeding structures, according to an embodiment of the present invention.

Referring to FIG. 6B, the antenna includes the conductive components 620), which are connected with a plurality of electronic components, and a connection component 630 providing a wiring to the electronic components. These conductive and connection components constitute the first antenna structure. The embodiment illustrated in FIG. 6B differs from that of FIG. 6A in that the connection component 630 is connected with a circuit board (e.g., the circuit board 110) at the center instead of the left side of the conductive components 620. As shown in FIG. 6B, the first antenna structure is fed power at a plurality of points. For example, the power feeding is provided at left and right points of the connection component 630. With this configuration, the antenna may receive signals of diverse frequency bands by current paths generated the power feeding and the ground. In an embodiment of the present invention, the antenna includes the first antenna structure, and a common or supplementary antenna radiator, i.e., a second antenna structure, extending from at least one of point 640 or 641 of the first antenna structure.

Figure 6C:
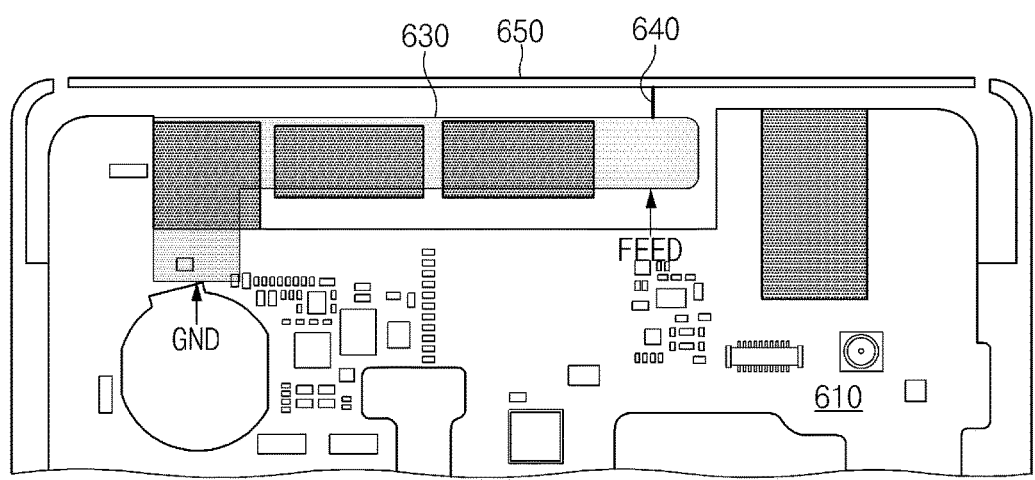
FIG. 6C is a diagram illustrating an antenna, which utilizes a case for a radiator, according to an embodiment of the present invention.

FIG. 6C is a diagram illustrating an antenna, which utilizes a case for a radiator, according to an embodiment of the present invention.

The embodiment illustrated in FIG. 6C is a modification of the embodiment illustrated in FIG. 6A. Referring to FIG. 6C, a first antenna structure is coupled with a second antenna structure 650, which extends from the point 640 and constitutes a part of an edge metal forming the exterior of an electronic device. In the configuration of FIG. 6C, a length of the second antenna structure (a length of the edge metal) is adjusted to correspond with a target frequency band. A part of the metal forming the whole edge may be segmented into one or more grooves by means of an injection process.

Figure 6D:
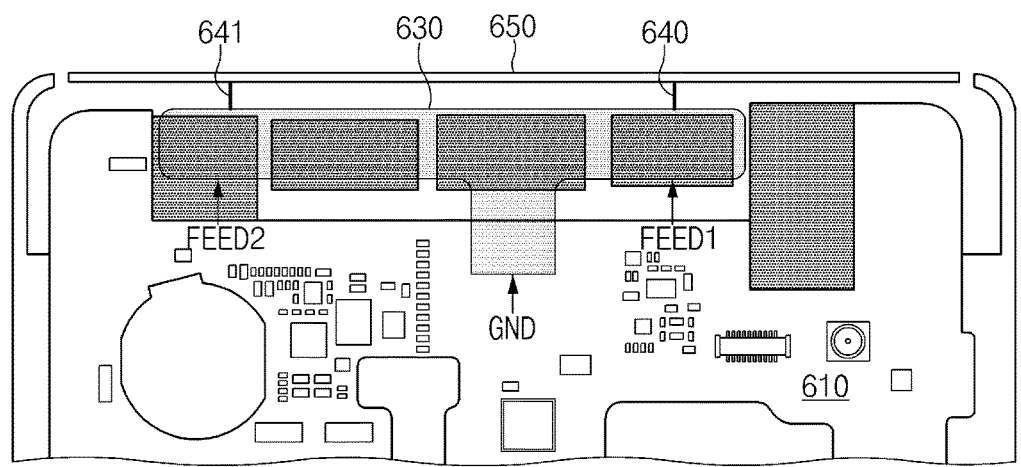
FIG. 6D is a diagram illustrating an antenna, which has a plurality of power feeding structures and utilizes a case for a radiator, according to an embodiment of the present invention.

FIG. 6D is a diagram illustrating an antenna, which has a plurality of power feeding structures and utilizes a case for a radiator, according to an embodiment of the present invention.

The embodiment illustrated in FIG. 6D is a modification of the embodiment illustrated in FIG. 6B. The second antenna structure 650 extends from the two points 640 and 641 of a first antenna structure, and includes a part of a metal edge forming the exterior of an electronic device. While the metal edge is illustrated as a single metallic piece, it may be formed of two or more segments.

Figure 7:
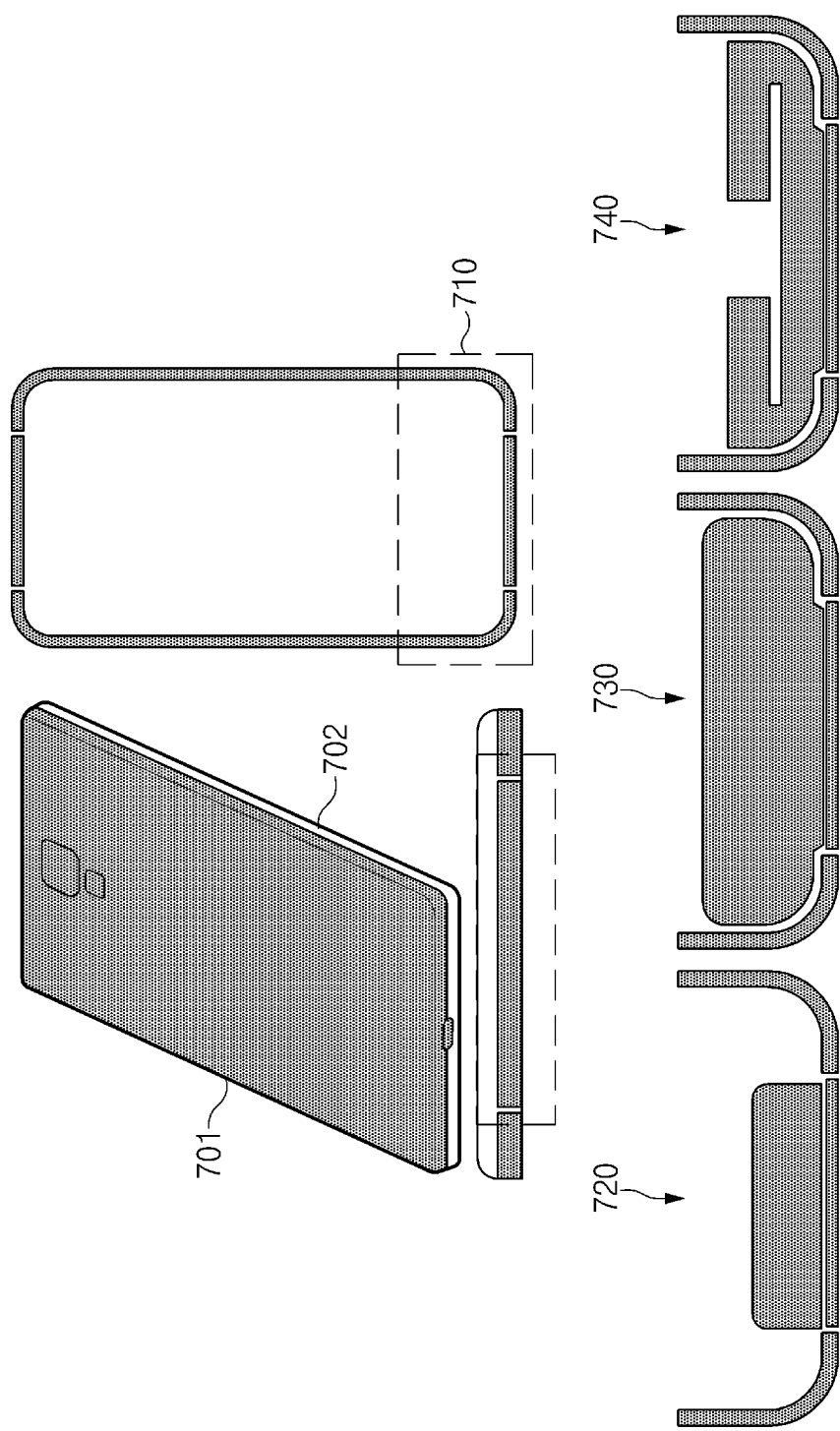
FIG. 7 is a diagram illustrating an metal edge forming the exterior of an electronic device, according to an embodiment of the present invention.

FIG. 7 is a diagram illustrating a metal edge forming the exterior of an electronic device, according to an embodiment of the present invention.

Referring to FIG. 7, the exterior of the electronic device may be divided into an injection area 701 and a metallic area 702. The metallic area 702 may be divided into a length that receives signals in a target frequency band. Additionally, conductive (e.g. metallic) support structures 720, 730, and 740 are shaped to correspond to the connection component 560 of FIG. 5A or 5B.

If the antenna shown in FIGS. 1A to 6D is installed in a bottom region 710 of an electronic device (e.g., if an RF module is placed in a sub-PCB), a part of the metallic area 702, which is placed on the bottom, is connected with (or coupled with) the antenna structure shown in FIGS. 1A to 6D and enables an antenna radiator. According to an embodiment of the present invention, if an antenna is installed on the top or side of an electronic device (e.g., in an internal structure in which an RF module is placed in a main PCB, or a battery is placed at the left of a terminal while a PCB is placed at the right of the terminal), at least a part of the metallic area 702 placed on the top or the side may be coupled with an antenna structure to operate as an antenna.

The variety of support structures 720, 730 and 740 for the bottom 710 of the metallic area 702 may be figured in a structure that includes a metallic exterior corresponding to an edge (case) and a slit between metallic decorations, or in an antenna structure by coupling with a part of the metallic area 702 at the point 640 that corresponds to the connection component 630. In this configuration, a size of the metallic decoration and a length of the slit may be used as parts in forming resonance and radiation for antenna operation. A size of the metallic decoration may affect an antenna length for resonance. Additionally, the metallic decoration may be coupled with another antenna structure (e.g., another part aside from the metallic decorations in the first and second antenna structures), or replaced with a second antenna.

Figure 8:
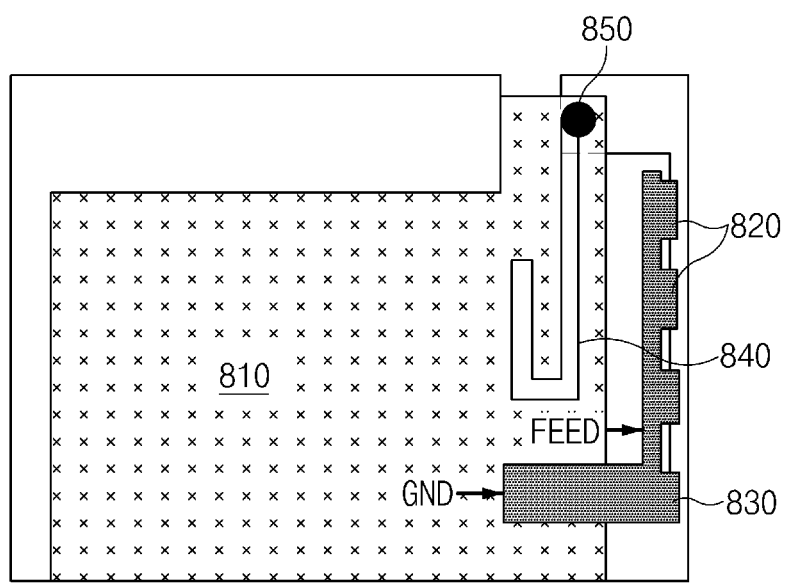
FIG. 8 is a diagram illustrating an antenna using a key component, according to an embodiment of the present invention.

FIG. 8 is a diagram illustrating an antenna using a key component, according to an embodiment of the present invention.

Referring to FIG. 8, a volume key, or a button or sliding key activating/deactivating a sleep or lock mode is placed at the side (or the top) of an electronic device. In this configuration, a conductive component 820 placed at a side of the key component including a plurality of buttons, and an FPC 830 connected with the key component, are disposed in an empty space at the side of a circuit board 810. The conductive component 820 and the FPC 830 (e.g., connection component) coupled with the conductive component 820 forms the first antenna structure. By feeding power at a point of the first antenna structure, and providing a ground at another point of the first antenna structure, the first antenna structure may function as a reversed F-type antenna. Additionally, an exterior metal 840 coupled with the conductive component 820 and the FPC 830 may function as a second antenna (e.g., a supplementary radiator) for transceiving a specific frequency band signal. If the exterior metal 840 is not long enough, it may possible to extend the second antenna inwardly to the circuit board 810 by way of a contact point 850.

Figure 9:
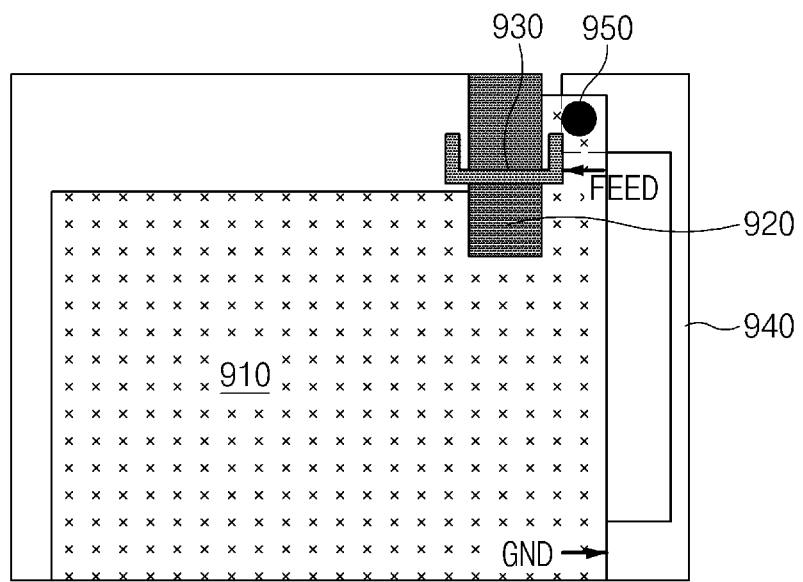
FIG. 9 is a diagram illustrating an antenna using an ear jack component, according to an embodiment of the present invention.

The antenna illustrated in FIG. 8 or FIG. 9 may be disposed in an electronic device along with those illustrated in FIGS. 1A to 7.

FIG. 9 is a diagram illustrating an antenna using an ear jack component, according to an embodiment of the present invention.

Referring to FIG. 9, the antenna includes a conductive component 920, an ear jack supporter 930, an exterior metal 940, and a contact point 950 connecting the ear jack supporter 930 with the exterior metal 940, all of which are disposed at a side of an ear jack. In this configuration, the conductive component 920 and the ear jack supporter 930 form a first antenna structure, while the contact point (i.e., connector) 950 and the exterior metal 940 form a second antenna structure.

The conductive component 920 is disposed in a partially cutoff region of a circuit board 910. A region at the bottom of the conductive component 920 that meets the circuit board 910 may form a ground for the first antenna structure. However, any contact part of the conductive component 920 able to electrically allow a ground toward the circuit board 910 may provide for the ground for the first antenna structure.

By feeding power to a point of the ear jack supporter 930, the antenna shown in FIG. 9 may be provided with the power feeding and the ground at different points of the first antenna structure, and is thereby enabled for operation accompanying the second antenna structure as an antenna radiator.

Figure 10:
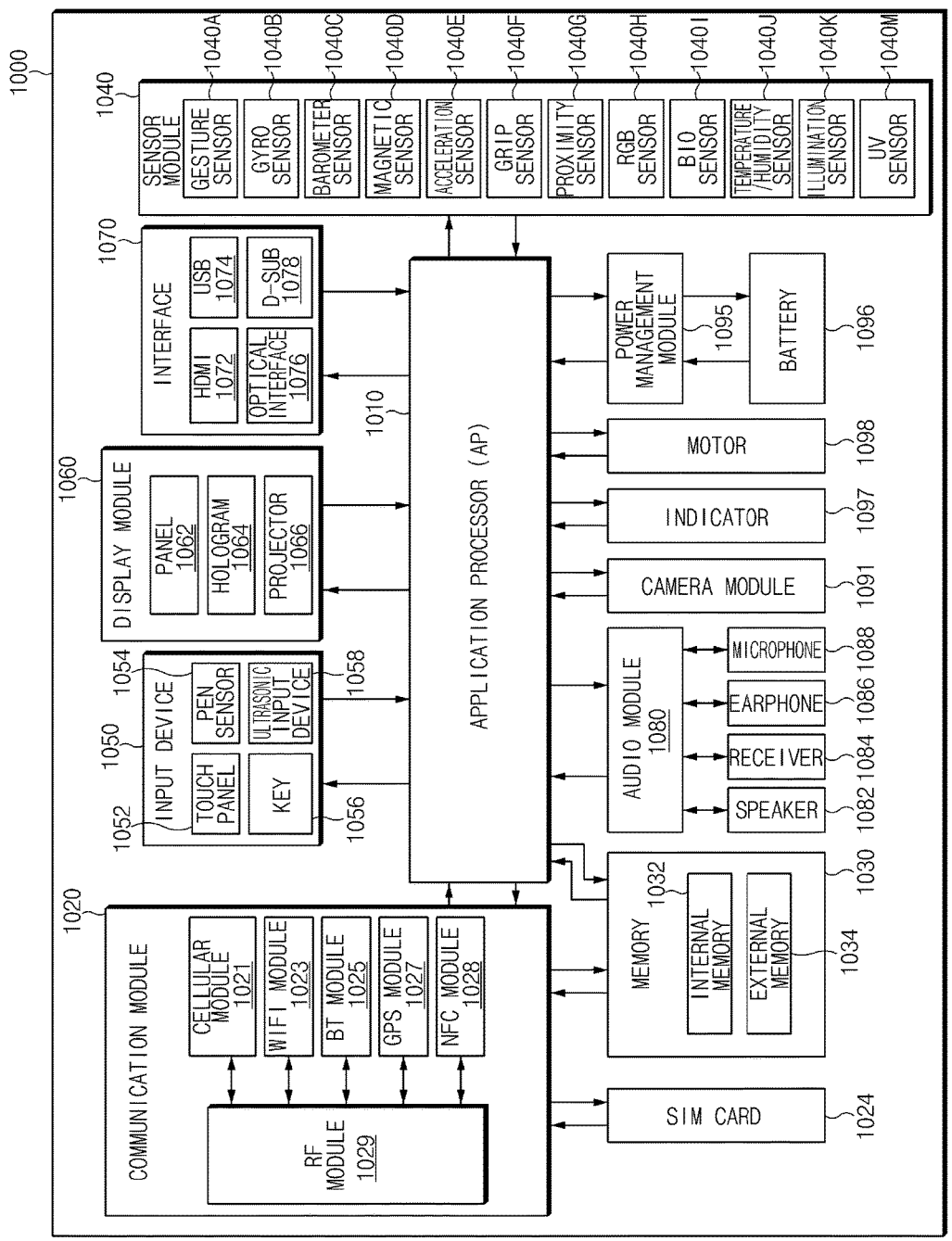
FIG. 10 is a block diagram illustrating an electronic device, according to an embodiment of the present invention.

FIG. 10 is a block diagram illustrating an electronic device, according to an embodiment of the present invention.

Referring to FIG. 10, an electronic device 1000 includes at least one AP 1010, a communication module 1020, a Subscriber Identification Module (SIM) card 1024, a memory 1030, a sensor module 1040, an input device 1050, a display module 1060, an interface 1070, an audio module 1080, a camera module 1091, a power management module 1095, a battery 1096, an indicator 1097, and a motor 1098.

The AP 1010 may drive an operating system or an application program to control a multiplicity of hardware or software elements connected thereto, and carry out a variety of multimedia data, data processing, and arithmetic operations. The AP 1010 may be implemented in, for example, a System-on-Chip (SoC). According to an embodiment of the present invention, the AP 1010 may further include Graphic Processing Unit (GPU).

The communication module 1020 may perform data transception (transmission and reception) in communication between different electronic devices connected with the electronic device 1000 by way of a network. According to an embodiment of the present invention, the communication module 1020 includes a cellular module 1021, a Wifi module 1023, a BT module 1025, a GPS module 1027, an NFC module 1028, and a Radio Frequency (RF) module 1029.

The cellular module 1021 may provide a voice call, a video call, a message service, or an Internet service by way of a communication network (e.g. LTE, LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). Additionally, the cellular module 1021 may perform differentiation and authentication for an electronic device by means of an identification module (e.g., the SIM card 1024) in a communication network. According to an embodiment of the present invention, the cellular module 1021 may perform a part of the functions conductible by the AP 1010. For example, the cellular module 1021 may perform at least a part of multimedia control functions.

According to an embodiment of the present invention, the cellular module 1021 may include a Communication Processor (CP). Additionally, the cellular module 1021 may be implemented in a form of SoC. While the components of FIG. 10, such as the cellular module 1021 (e.g. a communication module), the memory 1030, and the power control module 1095, are illustrated as being independent from the AP 1010, the AP 1010 may include at least a part (e.g., the cellular module 1021) of the aforementioned constituents in an alternate embodiment of the present invention.

According to an embodiment of the present invention, the AP 1010 or the cellular module 1021 (e.g., a communication module) may load commands or data, which are received from a nonvolatile memory or at least one other component being connected thereto, into a volatile memory and then process them. Additionally, the AP 1010 or the cellular module 1021 may store data, which is received or generated from at least one other component, into a nonvolatile memory.

The Wifi module 1023, the BT module 1025, the GPS module 1027, or the NFC module 1028 may include a processor for processing data that is transceived by way of a module corresponding thereto. While in FIG. 10 the cellular module 1021, the Wifi module 1023, the BT module 1025, the GPS module 1027, and the NFC module 1028 are illustrated as being respectively independent blocks, an embodiment of the present invention may be configured in which at least a part (e.g., two or more) of the cellular module 1021, the Wifi module 1023, the BT module 1025, the GPS module 1027, and the NFC module 1028 are included in an integrated chip (IC) or an IC package. For example, a single SoC may be prepared to accommodate at least a part (e.g., a communication processor corresponding to the cellular module 1021 and a Wifi processor corresponding to the Wifi module 1023) of processors corresponding respectively to the cellular module 1021, the Wifi module 1023, the BT module 1025, the GPS module 1027, and the NFC module 1028.

The RF module 1029 may transmit/receive data, for example, RF signals. The RF module may include a transceiver, a Power Amp Module (PAM), a frequency filter, or Low Noise Amplifier (LNA). Additionally, the RF module 1029 may further include a component, for example, a conductor or a conductive line, for transceiving electronic waves of free space in wireless communication. While in FIG. 10 the cellular module 1021, the Wifi module 1023, the BT module 1025, the GPS module 1027 and the NFC module 1028 are illustrated as sharing the single RF module 1029, an embodiment of the present invention may be configured in which at least one of the cellular module 1021, the Wifi module 1023, the BT module 1025, the GPS module 1027, and the NFC module 1028 transceiver transceive RF signals by way of an independent RF module.

The SIM card 1024 may be embodied as a subscriber identification module, and inserted into a slot formed in a predetermined position of an electronic device. The SIM card 1024 may contain identification information (e.g., Integrated Circuit Card Identifier (ICCID) or International Mobile Subscriber Identity (IMSI))

The memory 1030 includes an internal memory 1032 and/or an external memory 1034. The internal memory 1032 may include at least one of a volatile memory (e.g., Dynamic Random Access Memory (DRAM), Static RAM (SRAM), or Synchronous RAM (SRAM)) and a nonvolatile memory (e.g., One-Time Programmable ROM (OTROM), Programmable ROM (PROM), Erasable ROM (EROM), Erasable and Programmable ROM (EPROM), Electrically EPROM (EEPROM), mask ROM, flash memory, NAND flash memory, or NOR flash memory).

According to an embodiment of the present invention, the internal memory 1032 may be a Solid State Drive (SSD). The external memory 1034 may further include a flash drive, e.g., Compact Flash (CF), Secure Digital (SD), Micro-SD, Mini-SD, Extreme Digital (xD), or a memory stick. The external memory 1034 may be functionally connected with the electronic device 1000 by way of various types of interfaces. According to an embodiment of the present invention, the electronic device 1000 may further include a storage unit (or storage medium) such as, for example, a hard drive.

The sensor module 1040 may measure a physical quantity or detect an operating state of the electronic device 1000, and convert such measured or detected information into an electric signal. The sensor module 1040 includes at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g. Red/Green/Blue (RGB) sensor), a biosensor 1040I, a temperature/humidity sensor 1040J, an illumination sensor 1040K, and an ultra violet (UV) sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an infra-red (IR) sensor, an iris sensor, or a fingerprint sensor. The sensor module 1040 may further include a control circuit for controlling at least one or more sensors included therein.

The input unit 1050 includes a touch panel 1052, a (digital) pen sensor 1054, a key 1056, and/or an ultrasonic input unit 1058. The touch panel 1052 may sense a touch input in at least one of electrostatic, resistive, infra-reddish, and ultrasonic modes. Additionally, the touch panel 1052 may further include a control circuit. In an electrostatic mode, the touch panel 1052 may be operable by a physical contact or proximity sense. The touch panel 1052 may further include a tactile layer. With this configuration, the touch panel 1052 may enable a user to work using a tactual sense.

The (digital) pen sensor 1054 may be implemented as the same as or similar to the method of user's touch input, or using a specific sensing sheet. The key 1056 may include for example a physical button, or an optical key or keypad. The ultrasonic input unit 1058 may be a unit identifying data by sensing sound waves by a microphone (e.g., a microphone 1088) in the electronic device 1000, through input means generating an ultrasonic signal, capable of receiving wireless information. According to an embodiment of the present invention, the electronic device 1000 may receive a user's input from an external device (e.g., computer or server), which is connected thereto, by way of the communication module 1020.

The display 1060 includes at least one of a panel 1062, a hologram unit 1064, and a projector 1066. The panel 1062 may be a Liquid Crystal Display (LCD) or an Active Matrix Organic Light Emitting Diode (AM-OLED). The panel 1062 may be implemented for example in a flexible, transparent or wearable form. The panel 1062 may be configured in a single module with the touch panel 1052. The hologram unit 1064 may show a three-dimensional image in the air by means of optical interference. The projector 1066 may project light to a screen, showing an image. The screen may be placed for example within or outside of the electronic device 1000. According to an embodiment of the present invention, the display 1060 may further include a control circuit for controlling the panel 1062, the hologram unit 1064, or the projector 1066.

The interface 1070 includes a High-Definition Multimedia Interface (HDMI) 1072, a USB 1074, an optical interface 1076, and/or a D-subminiature (D-sub) 1078. Additionally or alternatively, the interface 1070 may include, for example, a Mobile High-definition Link (MHL) interface, a Secure Digital (SD)/Multi-Media Card (MMC), or an Infrared Data Association (IrDA) standard interface.

The audio module 1080 may provide bilateral conversion between sound and electrical signals. The audio module 1080 may process sound information that is input or output through, for example, a speaker 1082, a receiver 1084, an earphone 1086, or the microphone 1088.

The camera module 1091 may be a unit capable of taking still and motion images. According to an embodiment of the present invention, the camera module 1091 may include one or more image sensors (e.g., front or rear-faced sensors), a lens, an Image Signal Processor (ISP), or a flash (e.g., LED or xenon lamp).

The power control module 1095 may manage power of the electronic device 1000. The power control module 1095 may include for example a Power Management Integrated Circuit (PMIC), a charger IC, or a battery gauge.

The PMIC may be built, for example, in an integrated circuit or SoC semiconductor. A charging method may be classified into wired and wireless modes. The charger IC may help the battery to be charged, and prevent an inflow of excessive voltage or current. According to an embodiment of the present invention, the charger IC may include an IC for at least one of the wired and wireless charge modes. The wireless charge modes may include, for example, a magnetic resonance mode, a magnetic induction mode, or an electromagnetic wave mode. A supplementary circuit, e.g., a coil loop, a resonance circuit, or a rectifier, may be added for wireless charge.

The battery gauge may measure for example a residual quantity of the battery 1096, and a voltage, current, or temperature while charging the battery 1096. The battery 1096 may charge or generate electricity, and supply power to the electronic device 1000 from the charged or generated electricity. The battery 1096 may include for example a rechargeable battery or a solar battery.

The indicator 1097 may indicate a specific state of the electronic device 1000 or a part (e.g., the AP 1010) thereof, e.g., a booting state, a messaging state, or a charging state. The motor 1098 may convert an electrical signal into a mechanical vibration. The electronic device 1000 may include a processing unit (e.g., GPU) for providing a mobile TV. The processing unit for providing the mobile TV may process media data according to, for example, the standards of Digital Multimedia Broadcasting (DMB), Digital Video Broadcasting (DVB), or media flow.

The aforementioned elements of an electronic device, according to various embodiments of the present invention, may each be formed in one or more components, and names corresponding to the elements may vary based on the types of electronic devices. An electronic device, according to an embodiment of the present invention, may include at least one of the aforementioned elements, and a part of the elements may be excluded therefrom or other elements may be additionally included therein. Additionally, elements of an electronic device, according to various embodiments of the present invention, may be partly combined to form a single entity, which functions the same as the elements prior to the combination.

The term "module", as used herein, may imply, for example, a unit including one or more combinations among hardware, software, and firmware. The term "module" may be interchangeably used with terms such as unit, logic, logical block, component, or circuit. The module may be the minimum unit of a unitary component or a part thereof. The module may be the minimum unit for performing one or more functions, or a part thereof. The module may be implemented in a mechanical or electronic configuration. For example, the module, according to various embodiments of the present invention, may include at least one of an Application-specific Integrated Circuit (ASIC) chip, a Field-Programmable Gate Arrays (FPGAs), or a programmable logic device, which has been developed or will be developed to perform operations of the present invention.

According to an embodiment of the present invention, it may be effective to provide an antenna with a target frequency band while minimizing the influence from limiting the dimensions of the circuit board pattern, material, thickness, and so on. Moreover, since the components are settled indirectly on the circuit board, it may increase the flexibility of spatial displacement for the components.

Additionally, according to an embodiment of the present invention, it may be possible to turn a space, which is prepared for components of an electronic device, into that for an antenna thereof.

Additionally, according to an embodiment of the present invention, it may be advantageous to improve the efficiency of fabricating components equipped in an electronic device or repairing damages or disorders thereof.

Additionally, according to an embodiment of the present invention, it may be helpful in utilizing metallic pieces, which constitute the exterior of an electronic device, as an antenna.

While the invention has been shown and described with reference to certain embodiments thereof, it will be understood by those skilled in the art that various changes in form and detail may be made therein without departing from the spirit and scope of the invention as defined by the appended claims.

What is claimed is:
1. An electronic device comprising:
a housing;
a circuit board positioned inside the housing; and
an antenna radiator positioned inside the housing,
wherein the antenna radiator is fed from the circuit board, and comprises a plurality of conductive components, each of the plurality of conductive components being disposed on a portion of a respective one of a plurality of electronic components of the electronic device, and the plurality of conductive components being connected by at least one connection component,
wherein at least one of the conductive components includes a ground area that is configured to connect to a supporting unit for supporting a Flexible Printed Circuit (FPC) corresponding to the at least one connection component.

2. The electronic device according to claim 1, wherein the plurality of electronic components are disposed in a region of the electronic device where an insulator of the circuit board is outwardly exposed.

3. The electronic device according to claim 1, wherein at least one of the plurality of electronic components is disposed apart from and along a side of the circuit board.

4. The electronic device according to claim 1, wherein the plurality of conductive components include a first conductive component and a second conductive component, and the at least one connection component is disposed between the first conductive component and the second conductive component.

5. The electronic device according to claim 1, wherein the at least one connection component contacts a plurality of insulation areas, each of the plurality of insulation areas being disposed on a respective one of the plurality of conductive components.

6. The electronic device according to claim 1, wherein the at least one connection component contacts at least a portion of the plurality of electronic components.

7. The electronic device according to claim 1, wherein at least one of the plurality of electronic components is connected with the circuit board through one or more signal lines.

8. The electronic device according to claim 7, wherein the at least one connection component includes at least a part of the one or more signal lines.

9. The electronic device according to claim 7, wherein at least one of the plurality of conductive components contacts the FPC in which at least a part of the one or more signal lines are disposed.

10. The electronic device according to claim 9, wherein the plurality of conductive components are formed in a body with the FPC.

11. The electronic device according to claim 1, wherein at least one of the plurality of conductive components surrounds at least a side of at least one of the plurality of electronic components.

12. The electronic device according to claim 1, wherein the plurality of electronic components includes a first electronic component and a second electronic component, and the plurality of conductive components includes a first conductive component and a second conductive component,
wherein the first conductive component contacts at least a side of the first electronic component and the second conductive component contacts at least a side of the second electronic component.

13. The electronic device according to claim 12, wherein:
the at least one connection component includes a first signal line and a second signal line,
the first conductive component is connected with the first signal line, and
the second conductive component is connected with the second signal line.

14. The electronic device according to claim 1, wherein the antenna radiator is grounded through a region different from a feeding region of the antenna radiator.

15. The electronic device according to claim 1, wherein the at least one connection component comprises at least one of an FPC, a Steel Use Stainless (SUS), and a bracket.

16. The electronic device according to claim 15, wherein the at least one of the FPC, the SUS, and the bracket is connected with the circuit board or a case of the electronic device, and is fastened.

17. The electronic device according to claim 1, wherein at least one of the plurality of conductive components is a key component, and the at least one connection component corresponds to an FPC connected with the key component.

18. The electronic device according to claim 1, wherein the electronic device further comprises an additional antenna radiator connected with a point of the at least one connection component or of the at least one conductive component.

19. The electronic device according to claim 18, wherein the additional antenna radiator corresponds to at least a part of a piece of metal forming a side cover of the electronic device.

* * * * *